United States Patent Office 3,316,325
Patented Apr. 25, 1967

3,316,325
THERMOHARDENING RESIN COMPOSITIONS COMPRISING DIHYDROPYRAN DERIVATIVES AND AMINE ALDEHYDE CONDENSATES
John Leslie Hugh Allan, Manchester, England, assignor to Imperial Chemical Industries Limited, London, England, a corporation of Great Britain
No Drawing. Filed Nov. 30, 1964, Ser. No. 414,881
Claims priority, application Great Britain, Dec. 3, 1963, 47,677/63
7 Claims. (Cl. 260—856)

This invention relates to thermohardening compositions suitable for coating or casting purposes.

According to the present invention there are provided thermohardening compositions containing a polymerisable vinyl ether containing at least two vinyl ether groups per molecule and a modified or unmodified amine-formaldehyde condensate as herein defined, the amine-formaldehyde condensate being present at least in part in the form of a salt with a strong acid.

The polymerisable vinyl ethers, suitable for use in the thermohardening compositions of this invention, are ethers in which at least two vinyl groups are each joined to an ether oxygen atom.

They may have a generic formula such as:

(1) 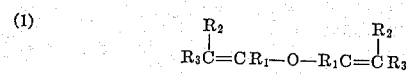

(2) 

or (3) 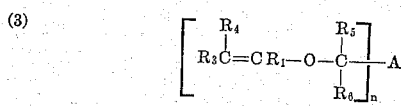

wherein $n$ is an integer having a value of at least 2, $R_1$ and $R_2$ are members selected from the group consisting of hydrogen and alkyl radicals, $R_3$ is a member selected from the group consisting of hydrogen, halogen atoms and hydrocarbyl radicals, $R_4$ and $R_5$ taken together form a member selected from the group consisting of two hydrogen atoms, two alkyl radicals and one alkylene or substituted alkylene radical, $R_6$ is a member selected from the group consisting of hydrogen and alkyl radicals and A is a linking group having a valence equal to $n$.

Examples of the aforementioned vinyl ethers are divinyl ether, diisopropenyl ether, butanediol divinyl ether, propylene oxide/polyol condensates of the formulae:

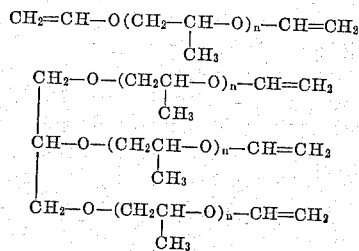

and

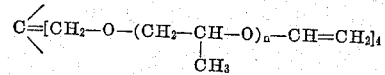

wherein $n$ is any integer, 3,4-dihydro-2H-pyran-2-methyl-(3,4-dihydro-2H-pyran-2-carboxylate) described hereinafter, 1,2-ethanedioxybis(3',4'-dihydro-2'H-pyran-2'-carbonyl) of the formula:

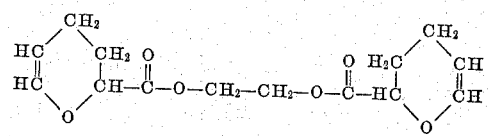

bis-(3,4-dihydro-2H-pyran-2-methyl)succinate of the formula:

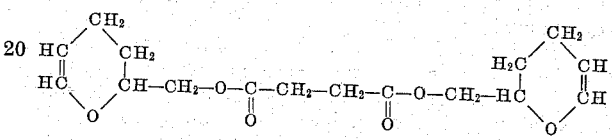

1,2-bis(3',4'-dihydro-2'H-pyran-2'-oxy)ethane of the formula:

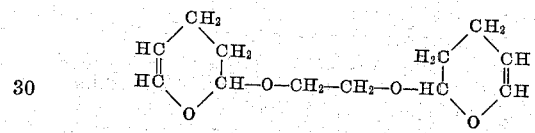

1,1-bis(3',4'-dihydro-2'H-pyran-2'-methoxy)ethane of the formula:

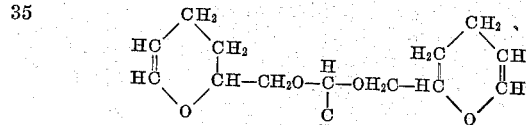

1,2-ethanedioxy-bis(3',4'-dihydro-5'-methyl-2'H-pyran-2'-carbonyl) of the formula:

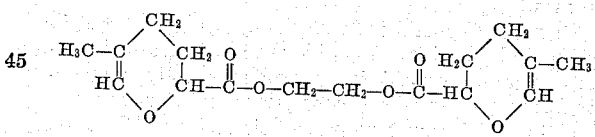

1,2 - bis(3',4' - dihydro - 5' - methyl - 2'H - pyran - 2'-oxy)ethane of the formula:

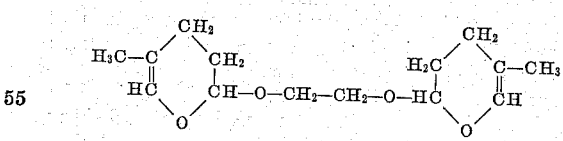

1,1 - bis(3',4' - dihydro - 5' - methyl - 2'H - pyran - 2'-methoxy)ethane of the formula:

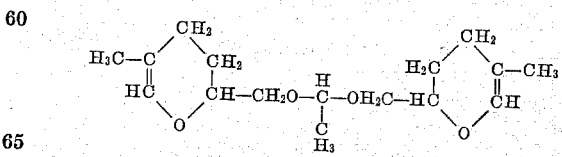

toluene - 2,4 - bis - 3(3',4' - dihydro - 2'H - pyran - 2'-methyl)carbamate of the formula:

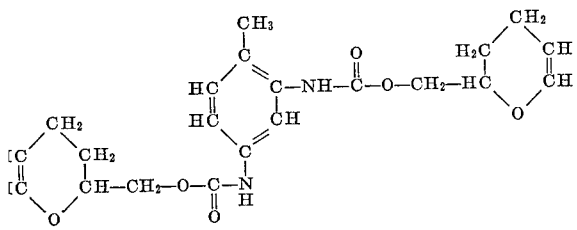

the tri-ester derived from three moles of 2-hydroxymethyl-3,4-dihydro-2H-pyran and one mole of orthophosphoric acid, and the esters derived from 2-hydroxymethyl-3,4-dihydro-2H-pyran and organic polybasic acids such as maleic and adipic acids. It has been found that the straight chain chain vinyl ethers are more reactive than branched chain or cyclic vinyl ethers.

By the term amine-formaldehyde condensate is meant a condensate of formaldehyde with a compound containing amino or amido groups reactive with formaldehyde. Examples of compounds containing formaldehyde reactive amino or amido groups include urea, thiourea, melamine, guanidine, acetoguanamine, benzoguanamine and other acylguanamines.

Condensates of such compounds with formaldehyde contain methylol groups and the number of such groups present may be varied considerably by the use of different ratios of formaldehyde/amine. The ratio of formaldehyde to amine may vary over a wide range depending, for example, on the number of formaldehyde reactive amino or amido groups and on the particular properties required in the final product. Thus in the case of melamine which contains three amino groups reactive to formaldehyde the proportion of formaldehyde used in the condensate may vary from one mole to six moles per mole of melamine. Further condensation of the methylol groups so introduced with further formaldehyde may lead to condensates with an even larger proportion of formaldehyde.

Preferred amine/formaldehyde condensates for use in the thermohardening compositions of the present invention are those condensates wherein the amine is melamine; particularly valuable condensates are those condensates in which one mole of melamine is condensed with at least 3 moles of formaldehyde. The condensates may be prepared by any of the methods well known in the art and the formaldehyde may be used in the form of a polymer thereof or may be obtained from a formaldehyde generator.

The amine/formaldehyde condensates may be used in the thermohardening compositions of the present invention in the unmodified form, or alternatively the condensates may be modified by etherification of some or all of the methylol groups with alcohols or by esterification of some or all of the methylol groups with acids.

The condensates may be etherified with any suitable alcoholic compound but preferred modified condensates are those in which the methylol groups have been at least partially etherified with lower aliphatic alcohols containing from 1 to 4 carbon atoms.

Examples of alcoholic compounds with which the amine/formaldehyde condensates may be modified by etherification include methanol, ethanol, propanol, isopropanol, butanol, ethylene glycol, diethylene glycol, glycerol and the monomethyl ether of ethylene glycol. The amine/aldehyde condensates may also be etherified or esterified with higher molecular weight compounds such as polyethers or polyesters containing hydroxyl groups and/or carboxyl groups.

The degree of modification of the amine/formaldehyde condensate by etherification or esterification may vary considerably, for example, in a condensate having six methylol groups, any fraction of the methylol groups may be etherified or esterified.

Thus, modified or unmodified amine/formaldehyde condensates which may be used in the thermohardening compositions of the present invention may vary considerably in the number of free hydroxyl(methylol), free =NH and —NH$_2$ groups that may be present. The preferred melamine resins contain from 3 to 6 methylol groupings, of which at least two are alkylated with a lower aliphatic alcohol, and they may be substantially monomeric or be partially in the condensed or polymeric form.

The modified or unmodified amine/formaldehyde condensates used in the present invention are weakly basic in character. The condensates are present in the thermohardening compositions of the present invention at least in part in the form of their salts with strong acids.

Strong acids which may be used for the formation of salts of the modified or unmodified amine/formaldehyde condensates used in the present invention include strong proton-donating acids and Lewis acids.

Examples of strong acids which may be used to form salts for use in the present invention include mineral acids such as hydrochloric acid and sulphuric acid, strong organic acids such as formic, chloroacetic, trichloroacetic, para-toluenesulphonic acid, naphthalene sulphonic acids, methanesulphonic acid, and oxalic acid, and Lewis acids such as boron trifluoride, trimethoxyborine, zinc chlorine, tin tetrachloride, aluminium chloride and antimony pentachloride. Other acids which are suitable include silicotungstic acid, hexafluorophosphoric acid, phosphoric acid, perchloric acid and fluoboric acid.

Particularly valuable acids are boron trifluoride complexes, p-toluene sulphonic acid and perchloric acid.

Mixtures of acids for example boron trifluoride and p-toluene sulphonic acid, may be used.

The salt of the strong acid and the modified or unmodified amine/formaldehyde condensate may be preformed before incorporation in the thermohardening condensate compositions or may be formed in situ therein.

The amount of acid normally used is from 1% to 5% by weight of the total weight of the composition excluding solvents.

It has also been found that there may be incorporated into the thermohardening compositions of the present invention compounds containing at least two hydroxyl, carboxyl, mercapto, amide, acetal or ortho-ester groupings.

The incorporation of such compounds leads to thermohardening compositions useful in the manufacture of a large variety of coatings or castings of varied properties.

Thus as a further feature of the present invention there are provided thermohardening compositions as hereinbefore defined and incorporating at least one compound containing at least two hydroxy, carboxyl, amide, mercapto, acetal or ortho-ester groups.

Examples of suitable compounds having two hydroxyl groups include ethylene glycol, 1,5-pentane-diol, glycerol, 1,2,6-hexane triol, diethylene glycol, propylene glycol polyethylene glycols, polypropylene glycols, castor oil, sugar alcohols, polyethers prepared by reaction of alkylene oxides such as propylene oxide with compounds containing two or more reactive hydrogen atoms and hydroxyl-ended polyesters.

Examples of compounds containing two carboxyl groups include succinic, adipic, azelaic, maleic, fumaric, itaconic, phthalic, isophthalic, terephthalic, trimellitic, trimesic and chlorendic (1,4,5,6,7,7 - hexachlorobicyclo-[2,2,1]-5-heptene-2,3-dicarboxylic acid)acids, and polymerised unsaturated fatty acids such as dimer acids. Anhydrides of suitable polycarboxylic acids can also be used.

Examples of suitable compounds containing two amide groups include the amide derivatives of any of the above listed polycarboxylic acids.

Examples of suitable compounds containing two mercapto groups include dithioethylene glycol and trithioglycerine.

Examples of compounds containing at least two acetal groups include glyoxal bis-diethylacetal, glyoxal bis-dibutylacetal and the bis-diethyl acetal of glutaric dialdehyde.

Examples of compounds containing at least two ortho-ester groups include hexamethyl ortho-succinate.

Mixtures of the above compounds may be used and alternatively there may be used compounds containing a mixture of hydroxyl, carboxyl, amide, mercapto, acetal and ortho-ester groups providing that a total of at least two such groups is present.

The proportions in which such hydroxyl, carboxyl, amide, mercapto acetal or ortho ester group-containing compounds are incorporated may vary considerably over a wider range.

Other ingredients such as are generally used in thermohardening compositions may also be incorporated, for example plasticisers such as isodecyl and nonyl alcohols, organic colouring matters, inorganic pigments, fireproofing agents and agents having the property of improving flow. Solvents may also be incorporated although they are not always necessary.

The ingredients of the thermohardening compositions may be mixed in any order except that when the salt of the amine/formaldehyde condensate is formed in situ it is preferable that salt formation should take place before the addition of the divinyl ether. Thus the addition of the acid to a mixture of the amine/formaldehyde condensate and divinyl ether is unsatisfactory, undesirable particles of gel being formed.

The thermohardening compositions of the present invention may be used for a variety of purposes; thus, they may be used for the production of surface coatings on wood or metal, as impregnants, as adhesives and for textile treatment. They may also be used for the production of mouldings or castings.

When the compositions are used for the production of coatings the constituents of the thermohardening compositions may be simply mixed and the mixture applied to a surface, for example tin plate, by brushing, spraying or other suitable means; the tin plate is then subjected to a stoving treatment generally at a temperature within the range 60° C. to 150° C. The duration of the stoving period may vary according to the thickness of the film required and if the composition contains a solvent, a drying stage may be incorporated before the stoving treatment.

In the compositions of the present invention the salts of the strong acids and the amine/formaldehyde condensates function as a latent acid catalyst; being the salts of a very weak base the said salts decompose readily on heating with liberation of free acid which catalyses the polymerisation and polyaddition reaction which leads to the hardening of the resin composition. The salts are however relatively stable at room temperature and thus the compositions have a long pot life under ambient conditions. The pot life may be further increased by the use of solvents.

In addition to acting as the basic portion of the salt, the amine/formaldehyde condensate due to the presence of >NH, >NCH$_2$OH and >NCH$_2$OAlkyl groups takes part in the acid catalysed curing reaction and forms close-linked structures with the other reactive components present in the composition. Thus, in order to ensure adequate neutralisation of the acid with amine/formaldehyde condensate, a considerable excess over that stoichiometrically required for salt formation may be used without deleterious effect on coatings produced from the thermohardening composition. When used in large proportions the amine/formaldehyde condensates are also found to have a considerable solvent action which increases the compatibility of the other components of the composition.

Although surface coatings and castings produced from the compositions of the present invention have good colour and colour retention, these properties can be further improved by the addition of small amounts of antioxidants such as phenolic antioxidants, sulpholene, triethylamine sulphur dioxide adducts. The last two examples also act as latent catalysts.

The invention is illustrated but not limited by the following examples in which all parts and percentages are by weight.

EXAMPLE 1

Thermohardening compositions 1A to 1P were prepared using the following components; in each case the divinyl ether was added as the last component.

*Divinyl ether.*—3,4-dihydro-2H-pyran-2-methyl-(3,4-dihydro-2H-pyran-2-carboxylate). [Acrolein tetramer] of the formula:

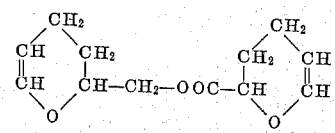

*Amine/formaldehyde condensate.*—A 90% solution in toluene of an approximately penta-(hydroxymethyl)melamine modified by methylation of from 4.2 to 4.5 of the hydroxymethyl groups.

*Acid catalyst used for salt formation.*—(A) 3% perchloric acid, (B) 3% toluene-3-sulphonic acid, (C) 2% boron trifluoride as a 48% solution in diethyl ether, and (D) 3% boron trifluoride as a 48% solution in diethyl ether.

TABLE I

| Example | Amine/formaldehyde condensate (parts) | Divinyl ether (parts) | Acid catalyst used | Hexane-1,2,6-triol (parts) | Isodecyl alcohol |
|---|---|---|---|---|---|
| 1A | 10 | 5 | B | 2.5 | 5 |
| 1B | 10 | 5 | A | 2.5 | 5 |
| 1C | 10 | 5 | A | 2.5 | 7.5 |
| 1D | 5 | 5 | A | 2.5 | 7.5 |
| 1E | 15 | 5 | A | 2.5 | 7.5 |
| 1F | 10 | 5 | A | 5 | 5 |
| 1G | 10 | 5 | A | 0 | 5 |
| 1H | 10 | 5 | A | 0 | 10 |
| 1I | 10 | 5 | B | 0 | 10 |
| 1J | 0 | 5 | A | 2.5 | 7.5 |
| 1K | 10 | 5 | C | 0 | 10 |
| 1L | 10 | 5 | A | Note (A) | 7.5 |
| 1M | 10 | 5 | A | Note (B) | 7.5 |
| 1N | 10 | 5 | A | Note (C) | 7.5 |
| 1O | 15 | 5 | D | 2.5 | 7.5 |
| 1P | 10 | 5 | D | Note (B) | 7.5 |

NOTES:
(A) Using diethylene glycol, 2.5 parts.
(B) Using 1:3-butylene glycol, 2.5 parts.
(C) Using trimethylol propane, 2.5 parts.

The amount of acid used is expressed as a percentage of the total solids present in the composition.

In Example 1G the amine/formaldehyde condensate described above is replaced by hexakis(methoxymethyl)melamine.

In Example 1J in which no amine/formaldehyde condensate was used, the constituents of the compositions were not completely compatible, heat was generated on adding the divinyl ether and particles of gel separated from the mixture.

With the exception of Example 1J which was unsatisfactory the remaining compositions were stored at room temperature for 12 hours and then films of 0.002″ dry thickness were cast onto tin plate and stoved for ½ hour.

The temperature of stoving and the properties of the stoved films are given in Table II.

TABLE II

| Example | Stoving temperature, °C. | Sward hardness | Mandrel flexibility | Resistance to methyl ethyl ketone | Gloss | Colour |
|---|---|---|---|---|---|---|
| | 100 | 12 | Pass 3/8″ | Excellent | 3 | 6 |
| | 100 | 30 | Pass 1/4″ | do | 10 | 10 |
| | 100 | 27 | Pass 1/8″ | Very good | 10 | 10 |
| | 100 | 28 | Pass 1/8″ | do | 10 | 9 |
| | 100 | 42 | Pass 3/16″ | Excellent | 10 | 10 |
| | 75 | 35 | Pass 1/2″ | do | 10 | 9 |
| (2) | 100 | 48 | Pass 3/4″ | do | 10 | 9 |
| | 120 | 30 | Pass 1/4″ | Very good | 10 | 9 |
| I | 120 | 21 | Pass 1/8″ | Moderate | 9 | 9 |
| | 120 | 20 | Pass 1/8″ | do | 9 | 9 |
| K | 120 | 20 | Pass 1/8″ | do | 9 | 8 |
| | 100 | 32 | Pass 1/8″ | Excellent | 8 | 9 |
| M | 100 | 39 | Pass 1/8″ | do | 10 | 9 |
| N | 100 | 33 | Pass 1/8″ | do | 10 | 9 |
| O | 100 | 32 | Pass 1/8″ | Very good | 10 | 9 |
| P | 100 | 22 | Pass 1/8″ | Good | 9 | 10 |

In Table II:
Gloss 10=very high gloss.
Gloss 0=matt finish.
Colour 10=colourless.
Colour 0=dark brown.

The colours of the above films may be improved by the addition of from 1–2% of an antioxidant, e.g. 2-α-methylcyclohexyl-4,6-dimethylphenol.

What I claim is:
1. Thermohardening compositions comprising (1) a dihydropyran derivative of the general formula

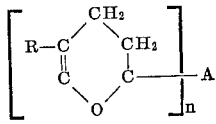

wherein $n$ is an integer of 2 or 3, A is a linking group having a valency equal to $n$ and R is selected from the group consisting of hydrogen and methyl, and (2) an amine-formaldehyde condensate selected from the group consisting of melamine-formaldehyde condensates and etherified derivatives thereof etherified with lower aliphatic alcohols containing from 1 to 4 carbon atoms, the amine-formaldehyde condensate being present at least in part in the form of a salt with a strong acid.

2. Thermohardening compositions as claimed in claim 1 wherein the vinyl ether is 3,4-dihydro-2H-pyran-2-methyl-(3,4-dihydro-2H-pyran-2-carboxylate).

3. Thermohardening compositions as claimed in claim 1 wherein the amine/formaldehyde condensate is a melamine/formaldehyde condensate containing from 3 to 6 methylol groups at least two of which are alkylated with a lower aliphatic alcohol.

4. Thermohardening compositions as claimed in claim 1 wherein the amine/formaldehyde condensate is present at least in part in the form of a salt with boron trifluoride, p-toluene sulphonic acid or perchloric acid.

5. Thermohardening compositions as claimed in claim 1 wherein the strong acid is present in an amount of from 1% to 5% by weight of the total weight of the composition excluding solvents.

6. Thermohardening compositions as claimed in claim 1 wherein the composition contains at least one compound selected from the group consisting of aliphatic diols and triols.

7. A process for the production of coatings which comprises mixing the constituents of a thermohardening composition as claimed in claim 1, applying the composition to a surface and then stoving the composition on the surface at a temperature of from 60° C. to 150° C.

References Cited by the Examiner

UNITED STATES PATENTS 2,847,399    8/1958    Melamed _____ 260—851

MURRAY TILLMAN, *Primary Examiner.*

J. C. BLEUTGE, *Assistant Examiner.*